Nov. 11, 1947.  J. J. JACOBSON  2,430,718
DISPENSING CONTAINER WITH EJECTOR PLUNGER
Filed Dec. 1, 1943
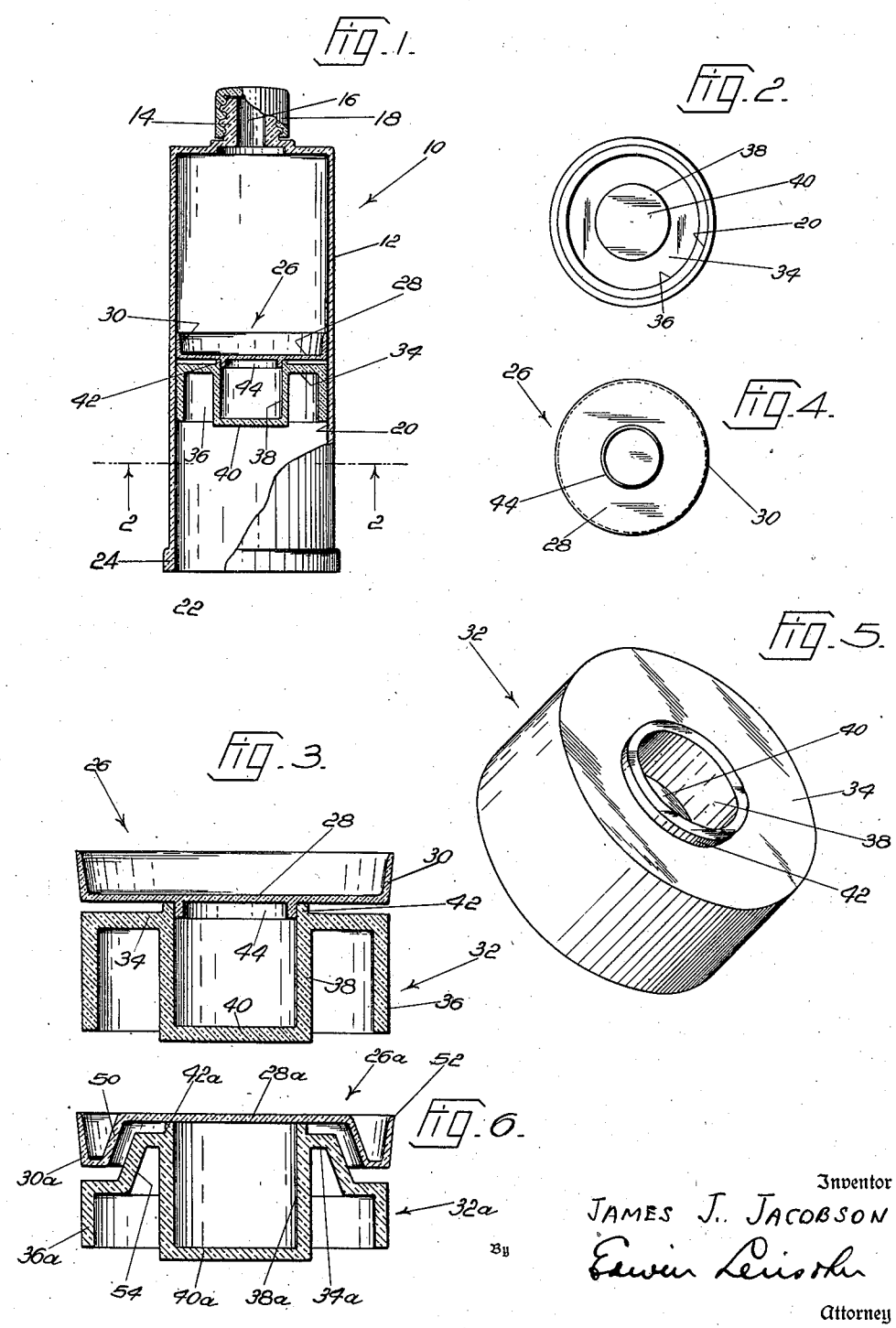
Inventor
JAMES J. JACOBSON
By
Edwin Leirother
Attorney Patented Nov. 11, 1947

2,430,718

UNITED STATES PATENT OFFICE 2,430,718

DISPENSING CONTAINER WITH EJECTOR PLUNGER

James J. Jacobson, New York, N. Y.

Application December 1, 1943, Serial No. 512,427

3 Claims. (Cl. 222—386)

This invention relates to dispensing containers.

One object of the invention is to provide a container which is well adapted to be used instead of collapsible metal tubes for packaging and dispensing various substances, for example, tooth paste, shaving cream, other products of paste or cream-like consistency, oils or other liquids, etc., the dispensing container being further characterized in the respect that it is provided with a plunger for ejecting the contents of the receptacle and which is constructed and arranged to provide a fluid-tight seal with the inner surface of the receptacle without requiring the use of separate packing rings or the like.

Another object of the invention is to provide a dispensing container of the above indicated character and which can be formed of a plastic whereby to produce a suitable and advantageous dispensing and packaging container without the use of metal.

A further object of the invention is to provide a dispensing container which can be readily converted into a spraying or atomizing device by attaching a spraying or atomizing nozzle or device to the outlet opening of the container.

A yet further object of the invention is generally to provide an improved dispensing and packaging container.

The above mentioned and other objects, features and advantages of the invention will be more fully understood from the following description, reference being had to the accompanying illustrative drawings.

Figure 1 is a side view partly in elevation and partly in section of a dispensing container embodying the present invention;

Figure 2 is a cross sectional view on the line 2—2 of Figure 1;

Figure 3 is an enlarged sectional view of the plunger removed from the receptacle;

Figure 4 is a bottom view of one of the plunger members;

Figure 5 is a perspective view of the other plunger member; and

Figure 6 is an enlarged sectional view of a plunger, illustrating a modification.

Referring now to the drawings in detail, the dispensing container 10 embodying the present invention comprises a receptacle 12 having at one end thereof a threaded neck 14 provided with an outlet opening 16 which is normally closed by a threaded cap 18. The inner surface 20 of the receptacle is preferably cylindrical and terminates at the bottom of the receptacle in an opening 22 which is of the same diameter as that of said inner surface. Also, as here shown, the base of said receptacle is provided with a bead or rib 24. Said receptacle is preferably formed of a plastic, but can be formed of glass or other suitable material.

In accordance with the present invention the container is provided with an ejector plunger for dispensing the contents of the receptacle through the outlet opening 16 thereof, and an important feature of the invention resides in the construction of this plunger whereby it maintains a fluid-tight seal with the inner surface 20 of the receptacle in order to prevent leakage of the contents and to seal the receptacle against the admission of air. Another important feature and advantage is the construction of the plunger whereby it can be made of a plastic and does not require any packing rings or the like for obtaining the fluid-tight seal with the receptacle. The plunger constructed in accordance with the present invention for accomplishing these results will now be described.

Said plunger comprises a hard, homogeneous integral member 26. Said member is formed in one piece of cellulose acetate or other suitable plastic material which is hard and somewhat elastic at ordinary temperatures, and comprises an imperforate thin and flexible disc 28 and a peripherally continuous integral flange or rim 30 which preferably has a slight flare toward the delivery end or outlet opening 16 of receptacle 12. Flange or rim 30 has a sliding fluid-tight engagement with the inner peripheral surface 20 of receptacle 12 and member 26 is sufficiently thin and flexible so that pressure or force exerted on disc 28 in the region thereof spaced inwardly of the peripheral edge of said disc at the outer side thereof and in a direction for moving the plunger toward the outlet 16, results, in conjunction with the opposing pressure or counteracting force of the contents of the receptacle against the opposite side in resisting said movement of member 26, in bowing the disc convexly toward the delivery end of the receptacle, whereby rim 30 is pressed against the inner peripheral surface 20 of the receptacle and prevents escape of the contents of the receptacle between said rim and the inner surface of the receptacle during the dispensing movement of the plunger. It will be understood that the pressure of the rim 30 against the wall of the receptacle is augmented by the pressure of the contents of the receptacle in a radial direction against said rim when the plunger is moved toward the delivery end of the receptacle.

The plunger includes a member 32 constructed and arranged to facilitate the movement of the plunger member 26 longitudinally of the receptacle 12 and to bring about the above described bowing of the disc 28 of said plunger member 26 during the dispensing operation of the plunger. Plunger member 32 is also preferably formed in one piece of cellulose acetate or other suitable plastic material. Said plunger member 32 comprises a top part 34 having an outer peripheral part or skirt 36 which has a sliding fit with the inner peripheral surface 20 of receptacle 12. The part 34 of plunger member 32 is also provided with a central opening defined by a peripherally continuous wall 38 which is closed at its outer end by the part 40 and provides the plunger with an axial part spaced from the peripheral part 36. The inner end of peripheral wall 38 projects forwardly beyond the plane of part 34 forming a peripheral bead 42. The disc 28 is provided with an integral peripheral bead 44 which has a sliding fit in the upper part of peripheral wall 38 and which is surrounded by the peripheral bead 42 of plunger member 32 so that said bead 42 engages the outer side of disc 28 of plunger member 26 and spaces the latter slightly from the confronting surface of part 34 of plunger member 32. The space between the confronting surfaces of disc 28 and part 34 of plunger members 26 and 32 respectively is preferably slight, say about 1/64 of one inch, and it will be understood that this space may be varied. In Figure 3, which is an enlarged view of the plunger, the space between the confronting surface of disc 28 and part 34 is shown exaggerated for the purpose of illustration. Preferably, member 32 is substantially rigid, the walls of member 32 being thicker than disk 28 and rim 30 of member 26. Part 40 at the outer end of wall 38 provides a member which may be engaged by a finger of the user of the device for moving the plunger in the dispensing operation thereof. The longitudinal extent of the plunger provided by rim 30 and skirt 36 is sufficient to prevent tilting of the plunger, thus making unnecessary the provision of any guide means other than that afforded by the engagement of said rim and skirt with the surface 20 of the receptacle. The interfitting parts 38 and 44 of plunger members 26 and 32 prevent relative tilting movement of said members and thus prevents tilting of either of said members in the receptacle.

From the above description it will be understood that when it is desired to operate the plunger for expelling some of the contents of the receptacle 12 through the outlet opening 16, the closure cap 18 having been removed, pressure is exerted on member 40 by the user's finger which is inserted into the receptacle through the open end 22 thereof. By reason of this pressure the plunger is moved toward the delivery end of the receptacle and simultaneously the disc 28 is bowed, as described above, toward the delivery end of the receptacle, thus pressing rim 30 of plunger member 26 tightly against the inner peripheral surface 20 of the receptacle for preventing the leakage between the inner surface 20 thereof and the rim 30 of plunger member 26.

In Figure 6, there is illustrated a modification of the above described plunger. As here shown, the flexible disc 28a of the plunger member 26a is provided with a rearwardly directed annular portion 50 which is connected to the rim 30a. The forward peripheral edge 52 of rim 30a preferably terminates in the plane of the flat central portion of the disc 28a and may even terminate rearwardly of said plane. Thus, the plunger may be moved closer to the outlet end of the receptacle than is possible with the plunger illustrated in Figures 1 to 5, or in other words, with the construction illustrated in Figure 6, less material is retained in the plunger member 26a than in the plunger member 26 since in the former the material retaining capacity is limited by that of the groove between the annular part 50 and the rim 30a while in the latter the retaining capacity is proportional to the total area of the disc 28. In the form of the plunger illustrated in Figure 6, the plunger 32a has a top part 34a provided with a peripherally continuous skirt 36a, an axial part 38a closed at its outer end by a part 40a, and a circular rib 42a which engages the disk 28a for bowing the same. Part 34a of plunger member 32a has a rearwardly extending peripherally continuous annular portion 54. It will be understood that the plunger members 26a and 32a may be formed of the same materials as plunger members 26 and 32 and are each preferably formed in one piece by molding the same.

If desired, the dispensing container of the present invention can be readily converted into a spraying device. This can be easily accomplished by attaching to neck 14 any suitable spraying nozzle or head (not shown) through which a liquid contained in receptacle 12 can be forced under pressure by operation of the ejector plunger. It will be understood that the spraying nozzle or head can be attached to the neck 14 of the container by screwing the nozzle or head on to the neck when closure cap 14 is removed.

Thus, it is seen that the dispensing container constructed as described above is well adapted to accomplish the several objects of the invention. It will be understood that it is within the scope of the present invention to construct the plunger without the provision for bowing the disc 28 of the plunger member 26, particularly where the contact between the rim 30 of member 26 and the inner surface of the receptacle is such as to prevent leakage of the contents of the receptacle between the inner surface thereof and the rim 30 of the plunger member. Also, it will be understood, that the dispensing container may be constructed in other respects otherwise than as hereinbefore specifically described without departing from the principles of the present invention.

Having thus described my invention, what I claim as new and desire to secure by Letters Patent is:

1. In a dispensing container comprising a receptacle having an outlet opening, an ejector plunger mounted for sliding movement in said receptacle toward said opening for dispensing the contents of the receptacle through said opening, said plunger comprising a hard, homogeneous member formed of a plastic and having an imperforate disc and an integral peripherally continuous rim extending from the peripheral edge of the disc in a direction toward said outlet opening, said rim having a fluid-tight engagement with the inner peripheral surface of said receptacle, and a one-piece member having a peripheral part positioned adjacent said rim and slidably engaging said peripheral surface of the receptacle and extending in a direction opposite to said first mentioned direction, and an axial part disposed centrally of the plunger radially inwardly of said peripheral part in spaced relation thereto, said axial part being integral with and extending in the same direction as said peripheral part and providing means for moving the plunger toward said outlet opening, said axial part being open at its end which is nearer said outlet opening, said members being separable from each other and said first mentioned member having an integral central portion projecting into said axially extending part through said open end and interfitting with said axially extending part for preventing relative tilting movement of said members in the receptacle, the combined extent of the engagement of said members with the peripheral surface of said receptacle longitudinally thereof preventing tilting of the plunger as a whole in the receptacle.

2. In a dispensing container comprising a receptacle having an outlet opening, an ejector plunger mounted for sliding movement in said receptacle toward said opening for dispensing the contents of the receptacle through said opening, said plunger comprising a hard, homogeneous member formed of a plastic and having an imperforate flexible disc and an integral peripherally continuous rim extending from the peripheral edge of the disc in a direction toward said outlet opening, said rim having a fluid-tight engagement with the inner peripheral surface of said receptacle, and a one-piece member positioned in said receptacle adjacent said first mentioned member having a peripheral part slidably engaging said peripheral surface of the receptacle adjacent the part thereof engaged by said rim and extending in a direction opposite to said first mentioned direction, and an axial part disposed centrally of the plunger radially inwardly of said peripheral part in spaced relation thereto, said axial part being integral with and extending in the same direction as said peripheral part and providing means for moving the plunger toward said outlet opening, said axial part having an opening at its end which is nearer said outlet opening and said disc having a part projecting through said opening into said axial part and slidably interfitting with said axial part, said axial part engaging the central portion of said flexible disc for flexing the latter toward the outlet of the receptacle whereby to press the rim of said flexible disc against the peripheral inner surface of said receptacle.

3. In a dispensing container comprising a receptacle having an outlet opening, an ejector plunger mounted for sliding movement in said receptacle toward said opening for dispensing the contents of the receptacle through said opening, said plunger comprising a hard, homogeneous member formed of a plastic and having an imperforate flexible disc and an integral peripherally continuous rim extending from the peripheral edge of the disc in a direction toward said outlet opening, said rim having a fluid-tight engagement with the inner peripheral surface of said receptacle, and a member positioned in said receptacle adjacent said first mentioned member having a peripheral part slidably engaging said peripheral surface of the receptacle adjacent the part thereof engaged by said rim and extending in a direction opposite to said first mentioned direction, and an axial part disposed centrally of the plunger radially inwardly of said peripheral part in spaced relation thereto, said axial part being integral with and extending in the same direction as said peripheral part and providing means for moving the plunger toward said outlet opening, said axial part having an opening at its end which is nearer said outlet opening and said disc having a part projecting through said opening into said axial part and slidably interfitting with said axial part, said last mentioned member having a surface spaced from the adjacent side of said disc and a portion integral with and projecting from said surface toward said side of the disc and engaging the central portion of the latter for flexing and bowing the latter toward said outlet opening whereby to press said rim of the first mentioned member radially against the inner peripheral surface of said receptacle.

JAMES J. JACOBSON.

REFERENCES CITED

The following references are of record in the file of this patent:

UNITED STATES PATENTS

| Number | Name | Date |
|---|---|---|
| 1,270,835 | Jersemann | July 2, 1918 |
| 1,504,423 | Boneberg | Aug. 12, 1924 |
| 1,964,623 | Durand | June 26, 1934 |
| 1,966,819 | Irvin | July 17, 1934 |
| 2,090,111 | Creveling | Aug. 17, 1937 |
| 2,172,517 | Papini | Sept. 12, 1939 |
| 2,236,727 | Dewees | Apr. 1, 1941 |
| 2,371,332 | Jacobson | Mar. 13, 1945 |

FOREIGN PATENTS

| Number | Country | Date |
|---|---|---|
| 394,945 | Great Britain | Sept. 28, 1931 |